United States Patent Office 2,758,533
Patented Aug. 14, 1956

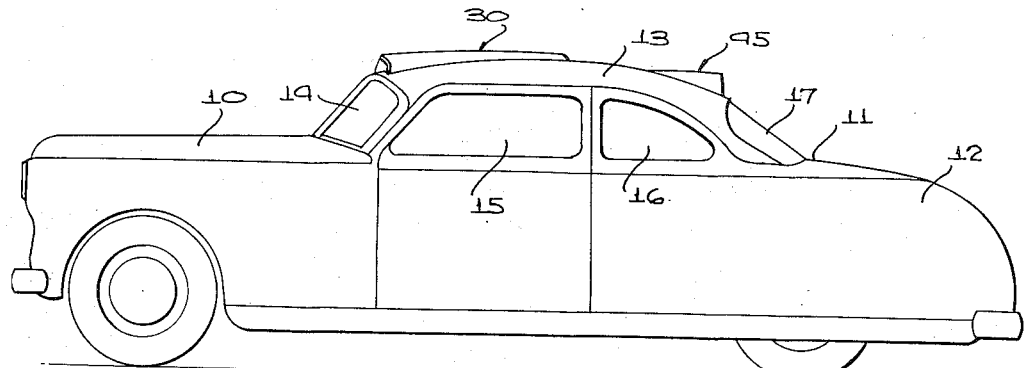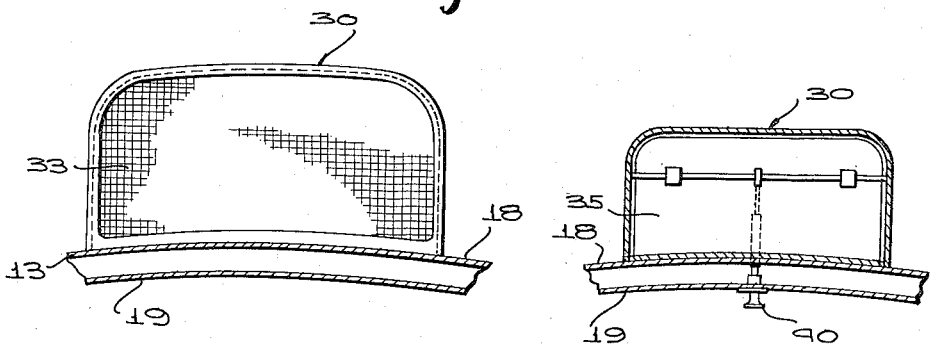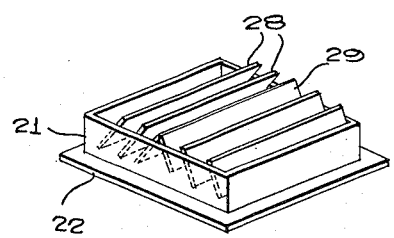

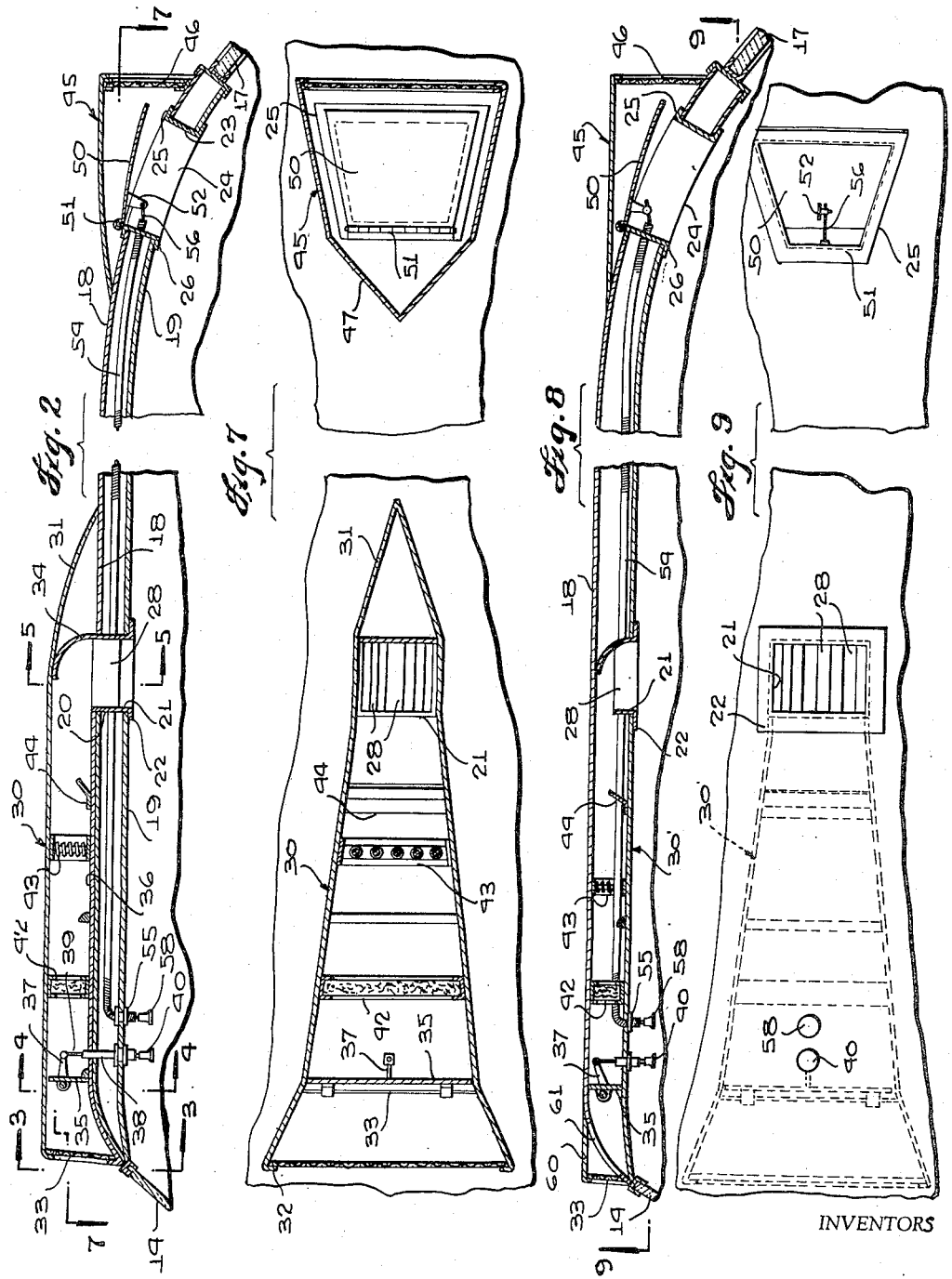

2,758,533

AUTOMOBILE VENTILATOR

Edith M. Hill and Frank Hill, Soldiers Grove, Wis.

Application September 4, 1953, Serial No. 378,597

1 Claim. (Cl. 98—2)

This invention relates to automobile ventilators and more particularly to ventilating apparatus mounted on and extending through the top of an automobile body.

It is among the objects of the invention to provide improved ventilating apparatus for an automobile body which provides a ventilating opening in the top of the automobile body disposed substantially centrally of the top, an inlet air duct disposed on the top and leading from the front edge of the top over the ventilating opening therein, a second ventilating opening provided in the top near the rear end thereof and an outlet air duct disposed on the top over the second ventilating opening and extending to the rear edge of the top; which includes a screen in the open front end of the inlet duct, a screen in the open rear end of the outlet duct, a hinged valve plate and an air filter in the inlet duct, and a valve plate in the outlet duct movable into and out of closing relationship with the corresponding opening; which includes air directing means in the opening covered by the inlet duct to deflect the entering air toward the opposite sides of the interior of the body; which provides ducts which are flat and transversely rounded and which enhance rather than detract from the apearance of the automobile body; which may include an ar heating unit; and which is of sufficient capacity to adequately ventilate the interior of an automobile body at moderate speeds of the automobile.

Other objects and advantages will become apparent from a consideration of the following description and the appended claim in conjunction with the accompanying drawings, wherein:

Figure 1 is a side elevational view of an automobile with ventilating apparatus illustrative of the invention applied thereto;

Figure 2 is a longitudinal medial cross sectional view of the top portion of the automobile body and the ventilating apparatus;

Figure 3 is a fragmentary cross sectional view on an enlarged scale on the line 3—3 of Figure 2;

Figure 4 is a transverse cross sectional view on an enlarged scale on the line 4—4 of Figure 2;

Figure 5 is a transverse cross sectional view on an enlarged scale on the line 5—5 of Figure 2;

Figure 6 is a perspective view of an air directing device mounted in the top of the automobile body and effective to deflect air entering the body to the opposite sides of the interior of the body;

Figure 7 is a longitudinal cross sectional view on the line 7—7 of Figure 2;

Figure 8 is a cross sectional view similar to Figure 2 but showing a somewhat modified arrangement; and Figure 9 is a cross sectional view on the line 9—9 of Figure 8.

With continued reference to the drawings, the automobile, as illustrated in Figure 1, is of conventional construction, having an engine compartment or hood 10 and a body 11 disposed rearwardly of the engine compartment and terminating in a trunk compartment 12. The body has a permanent top 13 and a windshield 14, side windows 15 and 16 and a rear window 17 disposed between the top and the lower portion of the vehicle body.

The top 13 comprises an outer wall or covering 18 of sheet metal and a lining 19 of fabric disposed below the cover 18 and, in some automobiles, spaced downwardly from the cover.

The ventilating apparatus of the present invention comprises an opening 20 provided in the top cover 18 substantially centrally of the top and extending through the lining 19, a rectangular sleeve 21 of rectangular shape being secured at its upper end in the opening 20 in the cover 18, extending through the opening in the lining 19 and having at its lower end an outwardly projecting flange 22 on which the portion of the lining 19 immediately surrounding the opening in the lining is secured. Near its rear end the cover 18 is provided with a second opening 23 disposed medially of the width of the top and a sheet metal sleeve 24 extends through the opening 23 and through a corresponding opening in the lining 19, having on its top or upper end an outwardly projecting flange 25 which overlies the top cover 18 immediately surrounding the opening 23 in the cover and having on its bottom end an outwardly projecting flange 26 on which the portion of the lining 19 immediately surrounding the opening in the lining receiving the sleeve 24 is secured.

The sleeve 21 is illustrated in detail in Figure 6 and includes a plurality of air deflecting vanes 28 which extend between opposite end walls of the rectangular sleeve longitudinally of the vehicle top 13 and are disposed substantially parallel to the opposite side walls of the sleeve. The two vanes at the center of the sleeve are joined together at their top edges and diverge downwardly from their top edges to provide an inverted V-shaped structure 29 extending longitudinally of the sleeve medially of the width thereof and the vanes at the opposite sides of the structure 29 are inclined downwardly and away from this structure so that air flowing downwardly through the sleeve 21 will be deflected toward the opposite sides of the interior of the automobile body 11.

An air inlet duct, generally indicated at 30, is mounted on the forward portion of the top cover 18 and extends from the front edge of the top to a location rearwardly of the sleeve 21 with its rear end portion downwardly curved and symmetrically tapered in width, as indicated at 31, to fair to the top surface of the top cover 18. The duct 30 is of tubular construction with its upper portion transversely rounded and has a width materially greater than its height or thickness and is tapered in width from its front end to its rear end, as illustrated in Figure 7. The front end of the duct is open and is provided with an inwardly directed flange 32 and a screen 33 of suitable material, such as wire cloth, is mounted in the open front end of the duct 30 in covering relationship to the open front end of the duct. An upwardly and forwardly curved deflector 34 extends from the top edge of the rear wall of the sleeve 21 to the inner surface of the top portion of the duct 30 to direct the air flowing through the open front end of the duct downwardly through the sleeve 21 and the air deflecting vanes 28.

A valve plate 35 of rectangular shape extends transversely of the duct 30 at a location spaced rearwardly from the screen 33 and has a size and shape substantially the same as the size and shape of the cross sectional area of the duct at the location of this valve plate. The valve plate 35 is hinged at its lower edge to the bottom wall 36 of the duct and an arm 37 extends rearwardly from the valve plate 35 medially of the length of this plate. A tube 38 extends through the bottom wall 36 of the duct, the cover 18 of the top and the lining 19 of the top rearwardly of the valve plate 35 and a rod 39 extends slidably through the tube 38 and is pivotally connected at its upper end to the distal end of the arm 37. A hand knob 40 is secured on the bottom end of the rod 39 and disposed within the vehicle body over the front or driver's compartment of the body so that the valve 35 can be opened and closed by the driver of the vehicle at will.

An air filter 42 extends transversely of the duct 30 rearwardly of the valve plate 35 so that all of the air passing rearwardly through the duct passes through the filter before it reaches the upper end of the sleeve 21 to remove from the air dust and other impurities which pass through the screen 33 at the open front end of the duct. If desired an air heating unit 43, heated by electrical energy from the vehicle electric system, may be disposed in the duct 30 to extend transversely of the duct, preferably to the rear of the filter 42, to heat the air passing through the duct when such heating is necessary or desired. A deflector 44 extends transversely across the bottom wall 36 of the duct near the front wall of the sleeve 21 and is rearwardly and upwardly inclined to deflect the air passing rearwardly through the duct 30 upwardly so that it will flow downwardly through the sleeve 21 without unnecessary turbulence.

An outlet duct 45 is mounted on the rear portion of the top cover 18 in covering relationship to the air outlet sleeve 24 and this duct has an open rear end disposed adjacent the rear edge of the top and covered by a wire mesh screen 46. The outlet duct 45 is much shorter than the inlet duct 30 and tapers in width from its open rear end to its front end, the front end portion thereof being curved downwardly and faired to the outer surface of the top cover 18, as indicated at 47.

A closure plate 50 is disposed in closing relationship to the upper end of the sleeve 24 and hinged at its forward edge to the upper edge of the forward wall of the sleeve 24, as indicated at 51 and an arm 52 extends downwardly from the closure plate 50 medially of the width of the plate. An elongated tube 54 extends at one end through the front wall of the sleeve 24 and forwardly between the top cover 18 and the lining 19, around the sleeve 21 and to a fitting 55 extending through the lining 19 adjacent the lower end of the tube 38. A wire or cable 56 is connected at its rear end to the lower or distal end of the arm 52 and extends slidably through the tube 54 and fitting 55, a knob 58 being secured on the front end of the wire 56 adjacent the inner surface of the top 13 and near the knob 40. The wire 56 is slidably movable through the tube 54 by the knob 58 to move the cover plate 50 into and out of closing relationship to the upper end of the sleeve 24 so that air can be drawn out of the body through the sleeve 24 and outlet duct 45, when desired, or can be held in the body by closing the plate 50 with the upper end of the sleeve 24.

The modified arrangement illustrated in Figures 8 and 9 is the same as the form illustrated in Figures 1 to 7, inclusive, and described except that in the modified arrangement the air inlet duct 30' is disposed mainly within the top portion of the vehicle body and below the top cover 18 except for a short front portion 60 disposed exteriorly of the body and the top cover 18 is provided in the front portion thereof with an opening 61 in registry with the interior of the duct 30'. As the remaining components of the modified arrangement are the same as those previously described, the same reference numerals are applied thereto.

The invention may be embodied in other specific forms without departing from the spirit or essential characteristics thereof. The present embodiments are, therefore, to be considered in all respects as illustrative and not restrictive, the scope of the invention being indicated by the appended claim rather than by the foregoing description, and all changes which come within the meaning and range of equivalency of the claim is, therefore, intended to be embraced therein.

What is claimed is:

In an automobile ventilator, the combination, with a vehicle top having an opening, of an air conduit having substantially the shape of an inverted U in cross section, said conduit being formed open at one end to provide an inlet therein, the conduit having a lower side engageable against said vehicle top at opposite sides of said opening, said opening constituting an outlet opening for the conduit; a sleeve of rectangular configuration mounted vertically in said outlet opening and formed open at its ends, to provide communication between said conduit and the interior of the vehicle, said sleeve having at its lower end an outwardly directed flange forming means to limit upward movement of the sleeve beyond a position in which the sleeve is in registration at its upper end edge with said vehicle top, said sleeve having a front wall, side walls, and a back wall in engagement with corresponding walls of said opening; a deflector integrally formed upon the back wall of the sleeve as an upwardly projecting extension of said back wall, said deflector projecting upwardly from the sleeve within the conduit and having at its upper end a portion curved toward said inlet and merging into the top of the conduit; and a baffle assembly mounted in said sleeve, said assembly including a center baffle of inverted V-shape in cross section, and side baffles at the respective sides of the center baffle and inclined transversely correspondingly to the inclination of the respective sides of the center baffle, said deflector being arranged transversely of the conduit over the full transverse dimension of the sleeve, so as to direct air flowing through the conduit downwardly into the sleeve across the full sleeve width, through the spaces defined between the center baffle and the several side baffles, said center and side baffles extending normally to said back wall and deflector, the baffle assembly constituting means for dispersing the downwardly flowing air over a substantial portion of the vehicle interior.

References Cited in the file of this patent

UNITED STATES PATENTS

| | | |
|---|---|---|
| 1,935,456 | McCarthy | Nov. 14, 1933 |
| 2,027,259 | Whitsitt | Jan. 7, 1936 |
| 2,036,485 | Lintern et al. | Apr. 7, 1936 |
| 2,049,701 | Guyot | Aug. 4, 1936 |
| 2,232,108 | Giacomini | Feb. 18, 1941 |
| 2,340,252 | Palmer | Jan. 25, 1944 |
| 2,523,104 | Emmert | Sept. 19, 1950 |
| 2,550,353 | Hopfinger | Apr. 24, 1951 |

FOREIGN PATENTS

| | | |
|---|---|---|
| 543,644 | Germany | Feb. 12, 1932 |
| 683,101 | France | June 6, 1930 |